United States Patent
Lee

(10) Patent No.: US 8,179,499 B2
(45) Date of Patent: May 15, 2012

(54) LIQUID CRYSTAL DISPLAY DEVICE

(75) Inventor: Young-Eun Lee, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 1172 days.

(21) Appl. No.: 12/005,628

(22) Filed: Dec. 28, 2007

(65) Prior Publication Data

US 2008/0231775 A1   Sep. 25, 2008

(30) Foreign Application Priority Data

Mar. 22, 2007   (KR) ................ 10-2007-0028263

(51) Int. Cl.
*G02F 1/1335*   (2006.01)

(52) U.S. Cl. ................ 349/68; 349/64; 349/62

(58) Field of Classification Search ........ 349/68
See application file for complete search history.

(56) References Cited

U.S. PATENT DOCUMENTS

| | | | |
|---|---|---|---|
| 5,143,433 A * | 9/1992 | Farrell | 362/29 |
| 7,195,367 B2 * | 3/2007 | Hong et al. | 362/97.3 |
| 2004/0051691 A1 * | 3/2004 | Hedrick | 345/102 |
| 2004/0240202 A1 * | 12/2004 | Sauska et al. | 362/216 |
| 2006/0193119 A1 * | 8/2006 | Kim | 362/29 |
| 2006/0232964 A1 * | 10/2006 | Hoshi et al. | 362/231 |
| 2007/0291512 A1 * | 12/2007 | Lee et al. | 362/633 |
| 2009/0141224 A1 * | 6/2009 | Ito et al. | 349/116 |

* cited by examiner

*Primary Examiner* — Thanh-Nhan P. Nguyen
(74) *Attorney, Agent, or Firm* — McKenna Long & Aldridge, LLP

(57) ABSTRACT

A liquid crystal display device capable of reducing a time delay in lighting of the liquid crystal display device includes a liquid crystal panel, at least one fluorescent lamps disposed below the liquid crystal panel, formed as a cylindrical shape having a central axis and supplying light to the liquid crystal panel, and at least one auxiliary optical source disposed to face the liquid crystal panel while having the central axis therebetween and supplying light to the fluorescent lamps.

24 Claims, 2 Drawing Sheets

LIQUID CRYSTAL DISPLAY DEVICE

This application claims the benefit of Korea Patent Application No. 10-2007-0028263, filed on Mar. 22, 2007, which is hereby incorporated by reference for all purposes as if fully set forth herein.

BACKGROUND OF THE INVENTION

1. Field of the Invention

The present invention relates to a liquid crystal display device, and more particularly, to a liquid crystal display device capable of reducing a time delay in lighting.

2. Discussion of the Related Art

With the rapid development in various fields of electronic devices, such as mobile phones, PDAs (Personal Digital Assistants), computers and large-screen TVs, the need for a flat panel display device applicable to such devices has recently been increased.

Flat panel display devices, such as an LCD (Liquid Crystal Display), a PDP (Plasma Display Panel), an FED (Field Emission Display), a VFD (Vacuum Fluorescent Display) and the like have been actively studied. However, considering the technology for mass production, facilitation of a driving unit and implementation of high-definition, the demand for the liquid crystal display (LCD) devices continues to increase.

The liquid crystal display device is a display device using optical anisotropy of liquid crystal, and implements an image by controlling optical transmissivity of the liquid crystal using an electric field.

Such liquid crystal display device includes a liquid crystal panel for displaying an image. Here, since the liquid crystal panel is a non-emitting device, a separate device for supplying light to the liquid crystal panel, called a "backlight unit," is needed.

The backlight unit is an optical source for emitting light, and may include a Cold Cathode Fluorescence Lamp (CCFL) and an External Electrode Fluorescent Lamp (EEFL), or other light source.

For example, the fluorescent lamp is formed as a transparent tube having a cylindrical shape. An inner wall of the lamp is coated with a fluorescent material and an electrode is formed at both ends of the tube. In general, the tube is filled with a mixed gas of several tens of torr and a predetermined amount of mercury.

In this fluorescent lamp, when a high voltage is applied to the electrode, electrons in the tube are drawn to the electrode, moving at high speed, and then collide with the electrode. As a result, secondary electrons are emitted to initiate discharge.

However, if the fluorescent lamp is kept in darkness for a long time, the electrons in the tube completely disappear. Accordingly, even though a voltage is applied to the electrode, the process of colliding electrons in the tube with the electrode to emitting the secondary electrons does not easily occur because there are few or no electrons in the tube before the voltage is applied. Thus, a time during which a current does not flow in the tube continues, causing a delay in lighting. This phenomenon occurs in proportion to the time which the lamp is left alone in the darkness.

Such time delay in lighting may cause a problem of displaying an image in the liquid crystal display device when the liquid crystal display device is left alone in the darkness for a long time. Therefore, light is not emitted from the fluorescent lamp for supplying light to the liquid crystal panel, thereby not displaying an image.

SUMMARY OF THE INVENTION

Accordingly, the present invention is directed to a liquid crystal display device that substantially obviates one or more of the problems due to limitations and disadvantages of the related art.

To solve the above-mentioned problems of the related art, the present invention may provide a high-quality liquid crystal display device which reduces a time delay in lighting of a fluorescent lamp used in the liquid crystal display device.

Another advantage of the present invention is to provide a liquid crystal display device that can minimize light leakage by disposing an auxiliary optical source at a lower direction side of a fluorescent lamp.

To achieve these and other advantages and in accordance with the purpose of the present invention, as embodied and broadly described herein, there is provided a backlight unit, including: an optical source for irradiating light to a liquid crystal panel, wherein the optical source includes at least one fluorescent lamp for supplying light to the liquid crystal panel, and at least one auxiliary optical source for supplying light to the fluorescent lamps.

There is further provided a bottom cover disposed below the liquid crystal panel to receive the fluorescent lamps and having at least one through-holes; and a reflector disposed above the bottom cover, covering the through-holes and reflecting the light emitted from the fluorescent lamps toward the liquid crystal panel.

To achieve these and other advantages and in accordance with the purpose of the present invention, there is provided a liquid crystal display device, including: a liquid crystal panel; at least one fluorescent lamps disposed below the liquid crystal panel and supplying light to the liquid crystal panel; a bottom cover disposed below the liquid crystal panel to receive the fluorescent lamps and having at least one through-holes; an inverter board disposed below the bottom cover and having an inverter to apply a voltage to the fluorescent lamps; and one or more auxiliary optical sources mounted on the inverter board and supplying light to the fluorescent lamps through the through-holes of the bottom cover.

The foregoing and other features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Hereinafter, a liquid crystal display device according to the present invention will be explained in detail with reference to the accompanying drawings.

Figure 1:
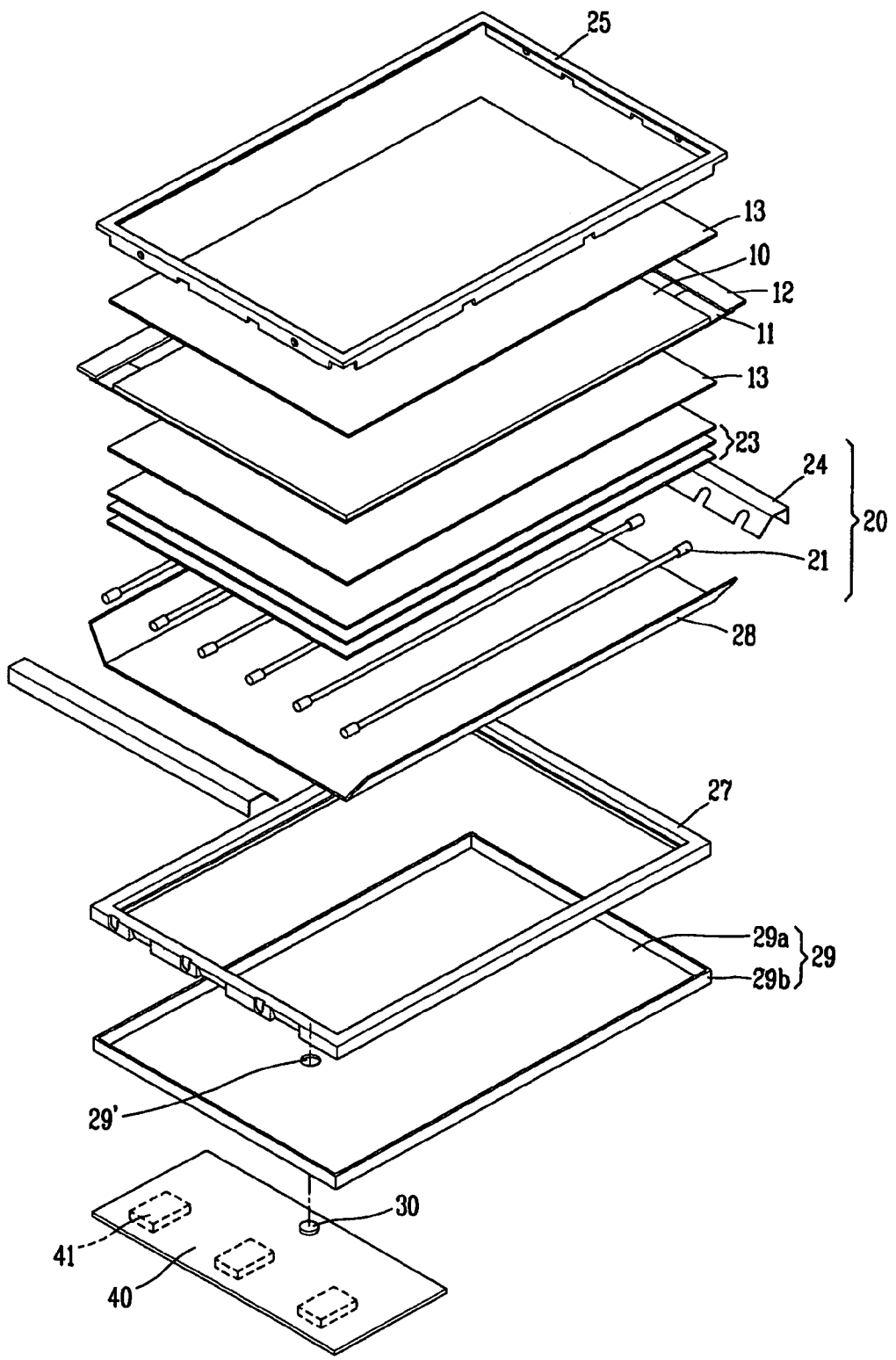
FIG. 1 is an exploded perspective view showing a liquid crystal display device according to one embodiment of the present invention.
Figure 2:
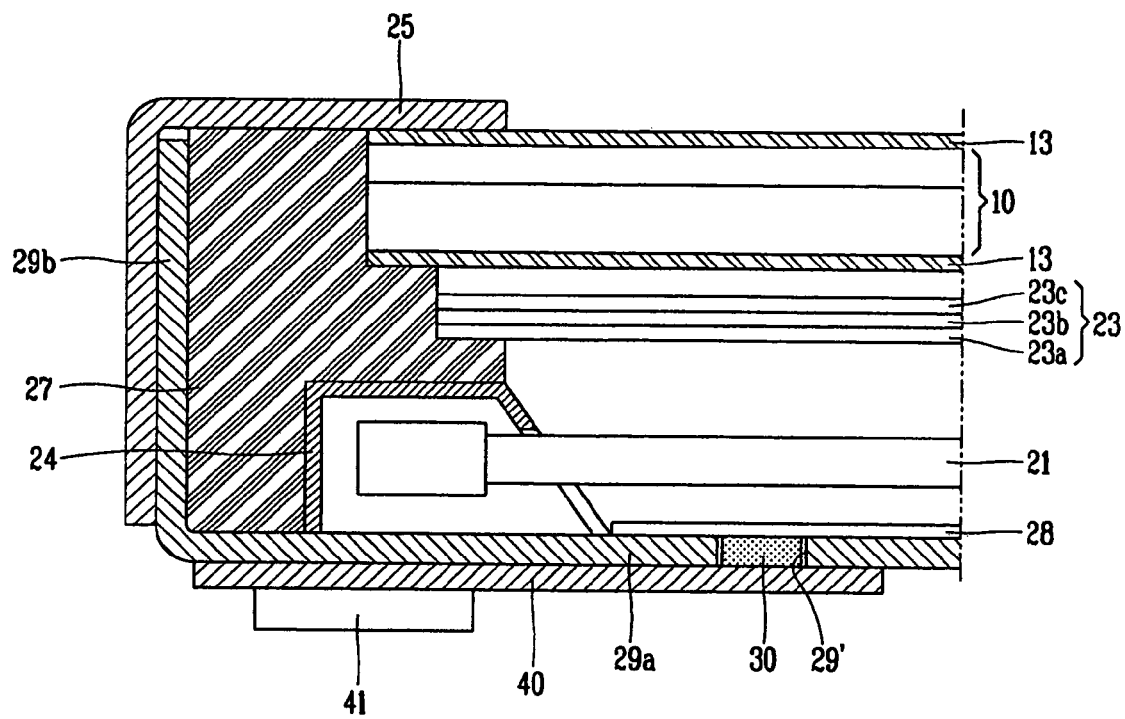
FIG. 2 is a cross-sectional view showing a liquid crystal display device according to one embodiment of the present invention.

FIG. 1 is an exploded perspective view showing a liquid crystal display device according to one embodiment of the present invention, and FIG. 2 is a cross-sectional view showing a liquid crystal display device according to one embodiment of the present invention.

Referring to FIGS. 1 and 2, the liquid crystal display device according to the present invention includes a liquid crystal panel 10 for displaying an image, a backlight unit 20 for supplying light from behind or below the liquid crystal panel 10, a main frame 27 for supporting an edge portion of the liquid crystal panel 10, a bottom cover 29 disposed behind or below the backlight unit 20 and housing or mounting the backlight unit 20, and a top case 25 coupled to the main frame 27 and fixing the edge portion of the liquid crystal panel 10.

Although not shown, the liquid crystal panel 10, may include a thin film transistor (TFT) substrate formed of a transparent material (e.g., glass), a color filter substrate, and a liquid crystal layer disposed between the TFT substrate and the color filter substrate.

Generally, in the thin film transistor substrate, gate lines and data lines cross each other in a matrix shape, thereby defining pixels. A thin film transistor (TFT) is formed in each of the pixels. The color filter substrate may include a black matrix and color filters for example, of red, green and blue, and a common electrode. Here, the common electrode may be formed on the thin film transistor substrate according to the driving type of the liquid crystal display device.

Further, the liquid crystal panel 10 may generally be formed as a rectangular plate shape, and also may include a display area for displaying an image and a non-display area for not displaying an image. In general, the non-display area is formed at an edge portion of the display area.

The top case 25 is provided above the liquid crystal panel 10 for exposing the display area of the liquid crystal panel 10 and for fixing the edge portion of the liquid crystal panel 10.

A drive integrated circuit (IC) IC 11 electrically connected to the gate lines formed on the substrate, and a printed circuit board 12 for applying electric signals to the gate lines, the thin film transistor, and the like are disposed at one side of the liquid crystal panel 10.

Signals from the printed circuit board 12 are transferred to the thin film transistor through the drive IC 11, and the thin film transistor applies a voltage to the pixels based on the signals, thereby driving the liquid crystal layer.

Polarizers 13 are disposed on front and rear surfaces of the liquid crystal panel 10 so as to polarize light passed through the liquid crystal panel 10. Generally, polarizers 13 may be disposed on the front and rear surfaces of the liquid crystal panel 10 so that polarizing axes thereof can cross to each other in a perpendicular direction.

The backlight unit 20 is disposed behind or below the liquid crystal panel 10 to supply light to the liquid crystal panel 10. The backlight unit 20 includes a fluorescent lamp 21 for generating light, and an optical sheet 23 for guiding light generated from the fluorescent lamp 21 toward the liquid crystal panel 10 so as to increase light efficiency.

Here, the backlight unit 20 shown in the drawings is a direct-type backlight unit in which a plurality of the fluorescent lamps 21 is disposed behind or below the liquid crystal panel.

In accordance with the present invention the liquid crystal display device, even though not shown, may also be an edge-type backlight unit in which an optical source is located to the side of the liquid crystal panel.

The optical sheet 23 may include a diffusion sheet 23a, a prism sheet 23b, and a protection sheet 23c, and the like, and serves to increase the efficiency of the light to be emitted toward the liquid crystal panel 10.

In addition, the diffusion sheet 23a serves to diffuse light from the fluorescent lamp 21 to supply the diffused light to the liquid crystal panel 10. And, the prism sheet 23b serves to concentrate the light diffused from the diffusion sheet 23a on a plane surface of the liquid crystal panel 10 in a vertical direction, and in general, two sheets thereof may be required. Among the optical sheets, the protection sheet 23c is disposed at the top of the sheets and protects the prism sheet 23b vulnerable to scratches.

A plurality of the fluorescent lamps 21 is disposed behind or below the optical sheet 23. The fluorescent lamp 21 may be formed as a cylindrical shape having a central axis, such as a Cold Cathode Fluorescent Lamp (CCFL), an External Electrode Fluorescent Lamp (EEFL), or the like. Support sides 24 may be disposed at each of both sides of the fluorescent lamp 21 so as to fix the fluorescent lamp 21. Openings may be formed at one side surface of the support side 24 to fix the fluorescent lamp, thereby inserting and fixing both ends of the fluorescent lamp 21.

An auxiliary optical source 30 is provided below the fluorescent lamp 21 to supply light to the fluorescent lamp 21. The auxiliary optical source 30 is disposed to face the liquid crystal panel 10 and may have a central axis therebetween. Details of such auxiliary optical source 30 will be described later.

A bottom cover 29 is disposed below the liquid crystal panel 10 and the fluorescent lamp 21 so as to receive the fluorescent lamp 21 while covering it.

The bottom cover 29 includes a bottom surface 29a disposed to be parallel with the liquid crystal panel 10 and a side surface 29b substantially vertically extending from the bottom surface 29a. Support sides 24 for fixing the fluorescent lamp 21 may be arranged at the pair of the side surfaces 29b facing each other in the longitudinal direction of the fluorescent lamp 21.

Further, a through-hole 29' may be formed on the bottom surface of the bottom cover 29. The auxiliary optical source 30 is inserted into or extend through the through-hole 29' and may be fixed by such insertion. Here, FIGS. 1 and 2 show that the auxiliary optical source 30 is disposed into the through-hole 29' of the bottom cover 29. However, the auxiliary optical source 30 may be disposed at an outside of the bottom cover 30. In this case, light of the auxiliary optical source 30 is supplied to the fluorescent lamp 21 through the through-hole 29' while the auxiliary optical source itself does not extend through the through-hole. Alternative locations of the auxilliary optical source 30 are also possible.

A reflector 28 is disposed at the bottom surface 29a of the bottom cover 29 so as to reflect light emitted from the fluorescent lamp 21 toward the liquid crystal panel 10. The reflector 28 may be formed to extend, having a predetermined angle, from a pair of side surfaces facing each other in a direction in which the support sides 24 are not disposed among the four sides of the reflector 28. Accordingly, light emitted from below the liquid crystal panel 10 is reflected onto the two extended side surfaces of the reflector 28, thereby increasing the light efficiency.

The reflector 28 may have a through-hole (not shown) for transmitting light of the auxiliary optical source 30 at a location corresponding to the through-hole 29' of the bottom cover 29. However, in order to minimize light leakage due to the auxiliary optical source 30, it is preferable to cover the through-hole 29' of the bottom cover 29. In general, since the reflector 28 is made of an white polyester film or the film coated with the a gold or an aluminum, the 90-97% visible ray is reflected from the reflector 28 and the 3-10% visible ray transmits through the reflector 28. Thus, in this invention a part of the light is reached to the lamp 21 from the auxiliary optical source 30 when the through-hole is not formed in the reflector 28.

If the reflector 28 has the through-hole, light from the auxiliary optical source 30 may be directly emitted through the liquid crystal panel 10, thereby causing the light leakage. Light leakage may be minimized by turning off the auxiliary optical source or using light in a non-visible range.

Meanwhile, a main frame 27 may be disposed at the edge portion of the liquid crystal panel 10 and the backlight unit 20 so as to fix and support the liquid crystal panel 10 and the backlight unit 20. The main frame 27 may be formed as a hollow, rectangular mold frame having upper and lower surfaces and having a stepped surface toward the inward direction, thereby supporting the edge portions of the liquid crystal panel 10, the optical sheet 23, and the like.

A printed circuit board (not shown) may be disposed below the bottom cover 29. The printed circuit board (not shown) may be an inverter board 40 to which an inverter 41 for applying a voltage to the fluorescent lamp 21 is mounted, or may include a driving circuit board for driving the liquid crystal panel 10.

FIGS. 1 and 2 show the inverter board 40 to which the inverter 41 is mounted below the bottom cover 29. Even though it is not shown, the fluorescent lamp 21 and the inverter 41 may be electrically connected to each other by wires, and the like.

Even though it is not shown, the driving circuit board for driving the liquid crystal panel 10 may be the printed circuit board 12 connected to the drive IC 11, or may be a separate printed circuit board (not shown) electrically connected to the liquid crystal panel 10.

The inverter board 40 or the driving circuit board (not shown) may be disposed on the rear surface of the bottom cover 29 so as to minimize the volume of the liquid crystal display device. If the printed circuit board is disposed on the rear surface of the bottom cover 29, the auxiliary optical source 30 is mounted on the inverter board 40 or the driving circuit board.

The auxiliary optical source 30 may be separately provided from the printed circuit board. The auxiliary optical source 30 may be installed in the various positions, if the auxiliary optical source 30 can provide the optical energy to the lamp 21. For example, the auxiliary optical source 30 may be installed in the main frame 27.

However, mounting the auxiliary optical source 30 on the printed circuit board has an advantage of not requiring additional structure or assembly, thereby facilitating the formation. In particular, if the auxiliary optical source 30 is mounted on the inverter board 40, the auxiliary optical source 30 and the inverter board 40 may be electrically connected to each other, thereby not requiring a connection process using additional wires between the auxiliary light source 30 and the inverter 40, thus facilitating the installation.

According to the photoelectric effect, the electrons are generated to collide with the electrode only when a voltage greater than a certain level is applied. Then, secondary electrons are generated, thereby generating light. However, if the fluorescent lamp 21 is kept in the darkness for a long time, the electrons in the tube substantially completely disappear, thereby causing a delay in generating light. That is, even though a voltage is applied to the electrode, a process that the electrons in the tube collide with the electrode to emit secondary electrons does not easily occur when there are few or no electrons. Accordingly, a time during which a current does not flow in the tube continues, causing delay in lighting.

Such phenomenon occurs in proportion to the time that the lamp is left alone in the darkness.

Accordingly, in order to prevent such delay in lighting, the present invention is characterized in that the auxiliary optical source 30 for forming electrons in the tube of the fluorescent lamp 21 is disposed on the inverter substrate 40. The auxiliary optical source 30 serves to transfer energy in which a material in the tube of the fluorescent lamp 21 emits electrons. This corresponds to the photoelectric effect in which if light greater than a predetermined frequency is reflected onto a material (e.g., metal), the electrons escaped from the surface of the material. In general, when light greater than infrared wavelength is irradiated, the electrons are emitted.

The electrons generate the secondary electrons by colliding with the electrode in the tube, and the generated secondary electrons generate infrared rays by colliding with mercury atoms in the tube. The infrared rays cause a fluorescent material coated in the tube to be in an excited state. As the energy state is changed to the ground state, the excited fluorescent material is stabilized. In this case, visible light rays are emitted.

Here, the auxiliary optical source 30 of the liquid crystal display device according to one embodiment of the present invention is disposed to be adjacent to or overlapped with the fluorescent lamp 21 in a perpendicular direction downwardly from the liquid crystal panel 10 to minimize light leakage. That is, the auxiliary optical source 30 is disposed to face the liquid crystal panel 10 while having the central axis of the fluorescent lamp 21 therebetween. The auxiliary optical source 30 may be located on the inverter board 40 or the bottom cover 29. In addition to the inverter board 40 or the bottom cover 29, the auxiliary optical source 30 may also be disposed anywhere, and the structure may be located behind or below the fluorescent lamp 21. The auxiliary optical source 30 may be disposed to be substantially adjacent to or overlapped with the fluorescent lamp 21.

The auxiliary optical source 30 serves to transfer energy for forming minimum electrons to the fluorescent lamp 21, but is a type of an optical source for emitting light. That is, the auxiliary optical source 30 provides activation energy to the fluorescent lamp 21.

If the auxiliary optical source 30 is disposed between the fluorescent lamps 21 adjacent to each other, light may leakage occur, thereby causing non-uniform luminance. Accordingly, the auxiliary optical source 30 is disposed to be adjacent to or overlapped with the fluorescent lamps 21 downwardly in a perpendicular direction based on the liquid crystal panel 10 such that the auxiliary optical source 30 is primarily covered (or blocked on a light of sight through the liquid crystal panel 10) by the fluorescent lamps 21.

Preferably, the auxiliary optical source 30 is disposed below the central axis of the fluorescent lamps 21 so as to supply light of the auxiliary optical source 30 to the fluorescent lamps 21.

Since the auxiliary optical source 30 is disposed below the central axis of the fluorescent lamps 21 except the electrode portion, and the electrode is positioned at both ends of the fluorescent lamps 21, the auxiliary optical source 30 may be disposed near ends of the fluorescent lamps 21 such that the electrons are generated near the electrode. However, the auxiliary optical source 30 is not limited to the above-mentioned location. As long as activation energy for generating the electrons is supplied, the auxiliary optical source may be located in the central portion of the fluorescent lamps 21 in its longitudinal direction.

Here, if there is a plurality of the fluorescent lamps 21, light energy is applied to fluorescent lamps 21 so as to form electrons. For this, the auxiliary optical source 30 is provided as the optical source of a wavelength range of energy which can form the electrons. The wavelength of energy to form the electrons in the fluorescent lamps 21 is at least shorter than the wavelength of the infrared rays.

Figure 3:
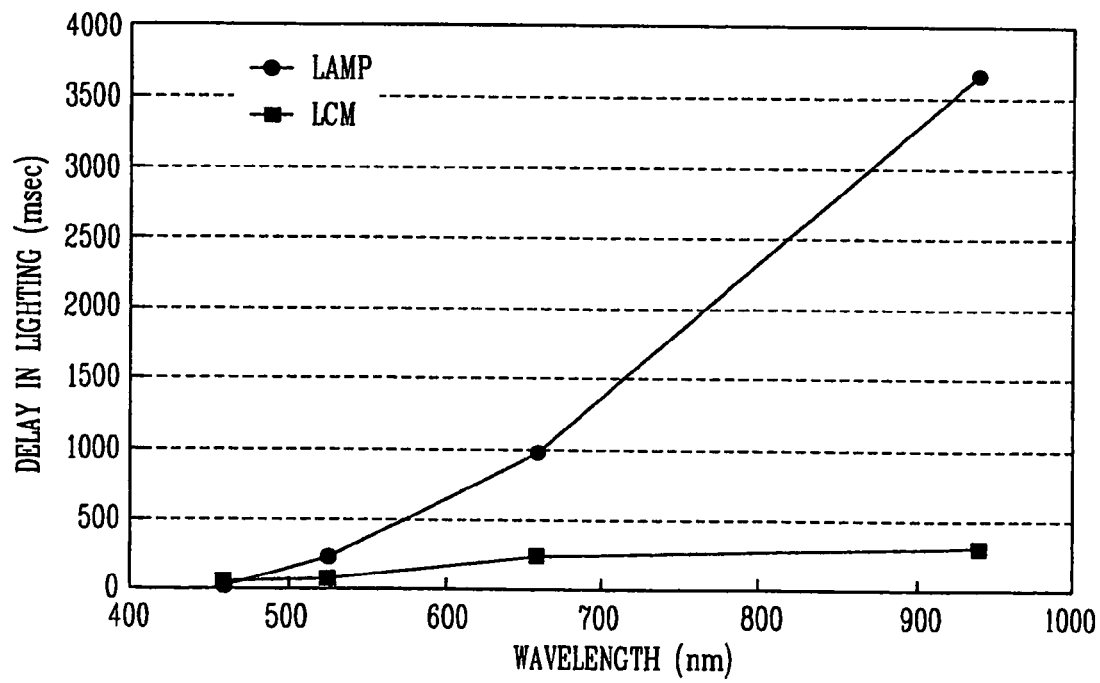
FIG. 3 is a graph showing the relationship between the wavelength of the auxiliary optical source and the delay in lighting in the prevent invention.

FIG. 3 is a view showing the graph showing the relationship between the wavelength of the auxiliary optical source and the delay in lighting in the prevent invention.

As shown in FIG. 3, the delay in lighting is increased in accordance with the wavelength λ of the auxiliary optical source 30. The delay in lighting is not occurred in the lamp 21 at the wavelength lower than 460 nm, while the delay in lighting is increased when the wavelength of the auxiliary optical source 30 is increased from 460 nm to 550 nm. Further, when the wavelength the auxiliary optical source 30 exceeds 500 nm, the delay in lighting is rapidly increased. Since the delay in lighting of the lamp 21 is dependent upon the energy applied to the lamp 21, the delay in lighting is increased according to the increase of the wavelength λ.

As described above, when the optical energy of the auxiliary optical source 30 is applied to the lamp 21, the secondary electrons are generated in the lamp 21. The secondary electrons are collided with a mercury atom to generate a ultraviolet ray. Thus, since the generation of the secondary electrons is determined by the amount of the optical energy applied to the lamp 21 from the auxiliary optical source 30, the generation of the secondary electrons is dependent upon the wavelength λ of the light to the lamp 21.

As shown in FIG. 3, the delay in lighting of the lamp 21 is shortest when the wavelength λ of the light from the auxiliary optical source 30 is less than 500 nm. The delay in lighting of the lamp 21 is getting longer when the wavelength λ of the light from the auxiliary optical source 30 is lengthening. Thus, it is appreciate to use the light source having the wavelength shorter than 500 nm as the auxiliary optical source 30. Further, it is more appreciated to use the light source having the wavelength shorter than 460 nm as the auxiliary optical source 30. The light having the wavelength shorter than 460 nm corresponds to the blue monochromatic light of the visible ray. Therefore, the blue monochromatic light or the ultraviolet ray are used as the auxiliary optical source 30 in this invention However, in this invention, the auxiliary optical source 30 is not limited to the blue monochromatic light and the ultraviolet ray. As shown in FIG. 3, the delay in lighting of the lamp 21 is decreased as compared with the darkness state when the green light (about 525 nm wavelength) and the red light (about 660 nm wavelength) are irradiated to the lamp 21. Comparing with the infrared ray, further, the green light and the red light make to shorten the delay in lighting of the lamp 21. Thus, the green light and the red light may be used as the auxiliary optical source 30 in this invention. In other word, in this invention any light having the wavelength less than that of the infrared ray may be used as the auxiliary optical source 30. However, it is appreciate to use the ultraviolet ray or the blue light as the auxiliary optical source 30 to minimize the delay the lighting of the lamp 21.

An LED (Light Emitting Diode) may be used for the auxiliary optical source 30 to emit the light of the above-mentioned wavelength, since the LED may emit light of various colors, be driven with low-power, and hardly cause a delay in lighting.

Further, the various device such as a semiconductor laser and a fluorescence lamp (having small size) are also appropriate for the auxiliary optical source 30. At this time, the Blue LED or semiconductor are used as the auxiliary optical source 30. Further, the Red and Green LED or semiconductor can be used as the auxiliary optical source 30.

For a case of the direct-type liquid crystal display device having a plurality of fluorescent lamps 21, if only one fluorescent lamp 21 is lit, other fluorescent lamps 21 are serially lit by the emitted light from the lit fluorescent lamp 21. Accordingly, it is possible to have only one auxiliary optical source 30. However, a plurality of auxiliary optical sources may be formed to supply sufficient energy.

Meanwhile, the auxiliary optical source 30 is driven prior to the fluorescent lamps 21 or simultaneous with the fluorescent lamps 21. Here, unlike the fluorescent lamps 21, it is preferable to use the auxiliary optical source 30 that has no or a very short delay in lighting.

When the auxiliary optical source 30 is lit prior to the fluorescent lamps 21, the electrons are generated in the fluorescent lamps 21 by the emitted activation energy from the auxiliary optical source 30, and then, when the fluorescent lamps 21 are driven, the lighting is substantially immediately performed without any delay.

Accordingly, the fluorescent lamps 21 and the auxiliary optical source 30 may be simultaneously lit, the auxiliary optical source 30 is immediately lit without any delay. As soon as the auxiliary optical source 30 is lit, energy is transferred into the fluorescent lamps 21 to generate the electrons, thereby lighting the fluorescent lamps 21.

Here, since the auxiliary optical source 30 is to provide a small amount of the electrons to drive the fluorescent lamps 21, the auxiliary optical source 30 does not need to be turned on while the fluorescent lamps 21 are lit. Thus, it is preferable to construct the driving circuit in a manner that the auxiliary optical source 30 is lit for a short time before the fluorescent lamps 21 is driven, and then turned off.

As described so far, according to the embodiments of the present invention, the auxiliary optical source can be used to reduce a delay in lighting by applying the energy to the fluorescent lamp. In this aspect, the various energy source may be used the means for shortening the delay in lighting of the lamp 2. That is, the secondary electron may be generated by applying the thermal energy to the lamp 21 to shorten the delay in the lighting. Further, the acoustic wave may be used to shorten the delay in the lighting.

The present invention may be embodied in several forms without departing from the essential characteristics thereof. For instance, the embodiments of the present invention describe the direct-type liquid crystal display device. However, without being limited to this, the edge-type liquid crystal display device may also be applied.

Therefore, the features herein should be construed broadly within its scope as defined in the appended claims, and therefore all changes and modifications that fall within the metes and bounds of the claims, or equivalence of such metes and bounds are therefore intended to be embraced by the appended claims.

According to the above-mentioned structure, the liquid crystal display device according to the present invention may reduce the delay in lighting by using the auxiliary optical source so as to reduce the delay in lighting of the fluorescent lamp. Further, the present invention may minimize light leakage by arranging the auxiliary optical source to be vertically below the fluorescent lamp, thereby implementing a high-quality liquid crystal display device having an improved image quality.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a liquid crystal panel;
   at least one fluorescent lamp disposed below the liquid crystal panel for supplying light to the liquid crystal panel;
   a bottom cover disposed below the liquid crystal panel to receive the fluorescent lamps and having at least one through-hole;
   an inverter board disposed below the bottom cover and applying a voltage to the at least one fluorescent lamp; and
   at least one auxiliary optical source mounted on the inverter board and supplying light to the fluorescent lamps through the at least one through-hole of the bottom cover,
   wherein the fluorescent lamp is disposed between the liquid crystal panel and the auxiliary optical source so that the light from the auxiliary optical source is not supplied to the liquid crystal panel.

2. The liquid crystal display device of claim 1, wherein the auxiliary optical source is an Ultraviolet (UV) light source.

3. The liquid crystal display device of claim 1, wherein the auxiliary optical source is a light emitting diode (LED).

4. The liquid crystal display device of claim 3, wherein the LED is one of blue LED and green LED.

5. A liquid crystal display device, comprising:
   a liquid crystal panel;
   a backlight unit behind the liquid crystal display panel, the backlight including at least one fluorescent lamp and an auxiliary optical source substantially adjacent the at least one fluorescent lamp for providing activation energy to the at least one fluorescent lamp; and
   a bottom cover behind the backlight unit and housing the backlight unit,
   wherein the fluorescent lamp is disposed between the liquid crystal panel and the auxiliary optical source so that the light from the auxiliary optical source is not supplied to the liquid crystal panel.

6. The liquid crystal display device of claim 5, wherein the auxiliary optical source is mounted on the bottom cover.

7. The liquid crystal display device of claim 5, further comprising an inverter board behind the bottom cover, wherein the bottom cover has at least one through-hole and wherein the auxiliary optical source is mounted on the inverter board and extends through the through hole to be substantially adjacent to the at least one fluorescent light tube.

8. The liquid crystal display device of claim 5, further comprising at least one through hole in the bottom cover, thereby the light from the auxiliary optical source is supplied to the fluorescent lamp through the through hole.

9. A method of illuminating a backlight unit having at least one fluorescent light tube of a liquid crystal display panel, comprising:
   providing activation energy to the at least one fluorescent light tube; and
   subsequently illuminating the at least one fluorescent light tube,
   wherein the fluorescent lamp is disposed between the liquid crystal panel and an auxiliary optical source so that the light from the auxiliary optical source is not supplied to the liquid crystal panel.

10. The method of claim 9, wherein providing the activation energy includes illuminating the auxiliary optical source substantially adjacent to the at least one fluorescent light tube.

11. The method of claim 10, wherein the auxiliary optical source is a UV light source.

12. The method of claim 10, wherein the auxiliary optical source is a light emitting diode (LED).

13. The method of claim 10, wherein the LED is one of blue LED and green LED.

14. The method of claim 9, wherein providing activation energy includes providing light in a predetermined wavelength range to the at least one fluorescent light tube.

15. The method of claim 14, wherein the predetermined wavelength range is the ultraviolet range.

16. The method of claim 14, where in the predetermined wavelength range is the blue to green wavelength range.

17. A method of manufacturing a liquid crystal display device, comprising:
   providing a liquid crystal display panel and at least one fluorescent lamp for illuminating the liquid crystal display panel;
   installing an auxiliary optical source substantially adjacent to the at least one fluorescent lamp,
   wherein the fluorescent lamp is disposed between the liquid crystal panel and the auxiliary optical source so that the light from the auxiliary optical source is not supplied to the liquid crystal panel.

18. A method of manufacturing a liquid crystal display device, comprising:
   providing a liquid crystal display panel in a housing;
   providing at least one fluorescent lamp within the housing for illuminating the liquid crystal display panel; and
   installing an auxiliary optical source substantially adjacent to the at least one fluorescent lamp,
   wherein the fluorescent lamp is disposed between the liquid crystal panel and the auxiliary optical source so that the light from the auxiliary optical source is not supplied to the liquid crystal panel.

19. The method of claim 18, the housing including at least a bottom cover below the liquid crystal display panel, wherein said at least one fluorescent lamp is received in the bottom cover, the bottom cover including a through-hole, such that the auxiliary optical source is mounted to extend through the through-hole from an exterior of the bottom cover.

20. The method of claim 19, further comprising mounting the auxiliary optical source on an inverter board disposed below the bottom cover, and inserting the auxiliary optical source through the through-hole.

21. The method of claim 20, wherein the auxiliary optical source is an Ultraviolet (UV) light source.

22. The method of claim 20, wherein the auxiliary optical source is a light emitting diode (LED).

23. The method of claim 22, wherein the LED is one of blue LED and green LED.

24. A method of driving a backlight of a liquid crystal display device, the backlight including a plurality of fluorescent lamps and an auxiliary optical source substantially adjacent the at least one fluorescent lamp for providing activation energy to the at least one fluorescent lamp, the method comprising:
   lighting the auxiliary optical source to supply the light from the auxiliary optical source to one of the fluorescent lamps when electrons of the fluorescent lamp is disappeared by the darkness;

driving the fluorescent lamp supplied with the light from the auxiliary optical source by activating the electrons thereof; and supplying the light from the drive fluorescent lamp to other fluorescent lamps to activate the electrons thereof.

* * * * *